United States Patent [19]

Smith

[11] Patent Number: 4,860,350

[45] Date of Patent: Aug. 22, 1989

[54] RETROFIT NETWORK INTERFACE APPARATUS

[76] Inventor: Thomas J. Smith, 1722 Asharoken Blvd., Bay Shore, N.Y. 11706

[21] Appl. No.: 226,662

[22] Filed: Aug. 1, 1988

[51] Int. Cl.⁴ .............................................. H04M 9/00
[52] U.S. Cl. .................................... 379/412; 379/399; D13/40
[58] Field of Search ............... 379/399, 412, 387, 441, 379/442; D13/40; 439/709, 716, 535, 521

[56] References Cited

U.S. PATENT DOCUMENTS

| | | | |
|---|---|---|---|
| D. 287,583 | 1/1987 | Smith et al. | D14/52 |
| 4,488,008 | 12/1984 | Dellinger et al. | 379/412 X |
| 4,624,514 | 11/1986 | Smith | 379/412 |

Primary Examiner—James L. Dwyer
Attorney, Agent, or Firm—Sachs & Sachs

[57] ABSTRACT

A retrofit telephone network interface apparatus for use in the subscriber loop of a telephone transmission system, i.e., connected to a non-telephone company owned premise wiring (a consumer household) and a telephone company owned portion of such loop at the junction where the two connect to each other. The apparatus is superimposed upon an existing station overvoltage protector and provides limited access, i.e., only a portion of the apparatus is made readily accessible to the consumer by providing a cover readily opened by him and a shield cover which may be readily opened by telephone company employees in order to provide access to electronic components owned by the telephone company. The device includes a base structure which includes a first and second set of terminals and a plug and receptacle arrangement for disconnecting the premise wiring from the telephone transmission system. The first set of terminals and the plug and receptacle are accessible to the consumer and access is denied to the remaining portion of the base member which includes a second set of terminals and a plurality of electronic components, unless opened by a telephone company employee having the proper tool therefor.

15 Claims, 7 Drawing Sheets

RETROFIT NETWORK INTERFACE APPARATUS

BACKGROUND OF THE INVENTION

1. Field of the Invention

The present invention relates to telephone network interface devices, and in particular, relates to a retrofit telephone interface apparatus suitable for connection between the premise wiring of a subscriber loop of a telephone transmission system at the junction where it connects to the telephone company owned portion of the subscriber loop and is adapted to cooperate with and convert existing station overvoltage protector installations.

2. Discussion of the Relevant Art

An individual homeowner at present may purchase and install his or her own telephone equipment and related appliances. The homeowner is responsible for the proper operation of the equipment that he has installed. The telephone company may not own the equipment in a subscriber's home and therefore will be responsible only for proper service up to the juncture between the telephone lines and the homeowner's premises. Thus, it is necessary to provide a telephone interface apparatus which is capable of readily disconnecting the homeowner's wiring, installed in the premises, from the telephone company's transmission lines so that when trouble occurs, it could readily be isolated to the telephone company's line or the homeowner's house wiring. If a homeowner experiences a problem with his telephone service it is first necessary for him to determine if it is the telephone company's fault and repairs are needed on their lines or equipment or if the wiring or equipment the homeowner installed requires repairs. Many devices are now available that provide the function of readily disconnecting the home wiring from the telephone company owned portion of the subscriber loop. Typical of these apparatuses is U.S. Pat. No. 4,488,008 issued to T. A. Dellinger et al on Dec. 11, 1984; U.S. Pat. No. Des. 287,583 issued to T. J. Smith, et al on Jan. 6, 1987, and U.S. Pat. No. 4,624,514 issued to Smith on Nov. 25, 1986.

These devices although providing the necessary function of severing the telephone company owned portion of the subscriber loop from the homeowner's portion of the subscriber loop are either inconvenient or capable of handling only a single loop. The instant invention provides a simple convenient means to provide a similar function for two telephone lines while utilizing existing station overvoltage protector installations. The shortcomings of the prior art are overcome and isolation between the components, terminals and circuitry, which is maintained by the telephone company is readily separated from and made nonaccessible to the subscribing homeowner. Yet, access to the terminals to which the subscriber must connect his equipment is made readily available and is protected by a non-evasive covering so that it is protected from the elements.

SUMMARY OF INVENTION

It is the object of the present invention to provide a retrofit telephone network interface apparatus which may readily be mounted upon existing overvoltage protector installations by the telephone company at the juncture where the subscriber loop becomes the property of the homeowner (subscriber) and the remaining portion remains the property of the telephone company.

It is another object of the present invention to provide a retrofit telephone network interface apparatus capable of containing within its housing the necessary electronic components needed by the telephone company at the juncture of the homeowner's premises and the telephone company's transmission lines.

It is still yet another object of the present invention to provide a limited access retrofit apparatus where the homeowner (subscriber) has access only to the terminals to which he must connect his internal house wiring and auxiliary equipment and is not afforded access to the remaining portion of the apparatus in which the telephone company's components are located.

It is still yet another object of the present invention to provide a retrofit telephone network interface apparatus in which the homeowner,s portion of the subscriber loop may be readily disconnected from the telephone company's portion of the loop and deny the house owner access to voltages which could injure the homeowner or permit him to disconnect the ground connection.

It is still yet another object of the present invention to provide a retrofit telephone network interface apparatus in which the owner of the premises may readily make a connection to the telephone company's transmission lines and still permit the telephone company to have provision for installing additional components and devices without concern that the homeowner would have ready access thereto.

It is still yet another object of the present invention to provide a retrofit telephone network interface apparatus to have all of the above features and be suitable for two subscriber telephone lines.

A retrofit telephone network interface apparatus providing limited access for the owner of premises having a telephone subscriber loop termination disposed thereon providing complete access by telephone service employees with the apparatus suitable for cooperating with existing station protector installations, according to the principles of the present invention, comprises a base member having a generally open top with a closed portion extending over the existing station protector apparatus when installed, a circumscribing wall portion including at least two outwardly extending C-shaped portions for receiving an elongated bar member in the open portion thereof, a bottom portion having an opening therein for receiving and engaging an existing station protector. First and second set of terminals are disposed in the base member, the first set of terminals are adapted to be connected to the owner of the premises subscriber loop termination and the second set of terminals are adapted to be connected the telephone company owned portion of the subscriber loop. Mating plug and socket members disposed in the base member have electrical contacts therein adapted to be electrically and mechanically engaged and disengaged with each other. The first set of wires electrically connect the plug to the first set of terminals and a second set of wires electrically connect the socket to the second set of terminals. A cover is provided with at least two outwardly extending bar members adapted to be received by and cooperate with the outwardly extending C-shaped portions of the base member to provide a complete invasive free cover for the open top base member. The extending bar members include at least one longitudinally extending protrusion. A shield is provided with a device receiving and cooperating with the bar members extending protrusions and is provided with a portion adapted to cover at least the second set of terminals, but not the first set of terminals.

The foregoing and other objects of the advantages will appear from the description to follow. In the description reference is made to the accompanying drawing which forms a part hereof, and in which is shown by way of illustration two specific embodiments in which the invention may be practiced. These embodiments will be described in sufficient detail to enable those skilled in the art to practice the invention, with like numerals being used for similar parts in both embodiments, and it is to be understood that other embodiments may be utilized and structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawing in which.

DESCRIPTION OF THE PREFERRED EMBODIMENTS

Figure 1:
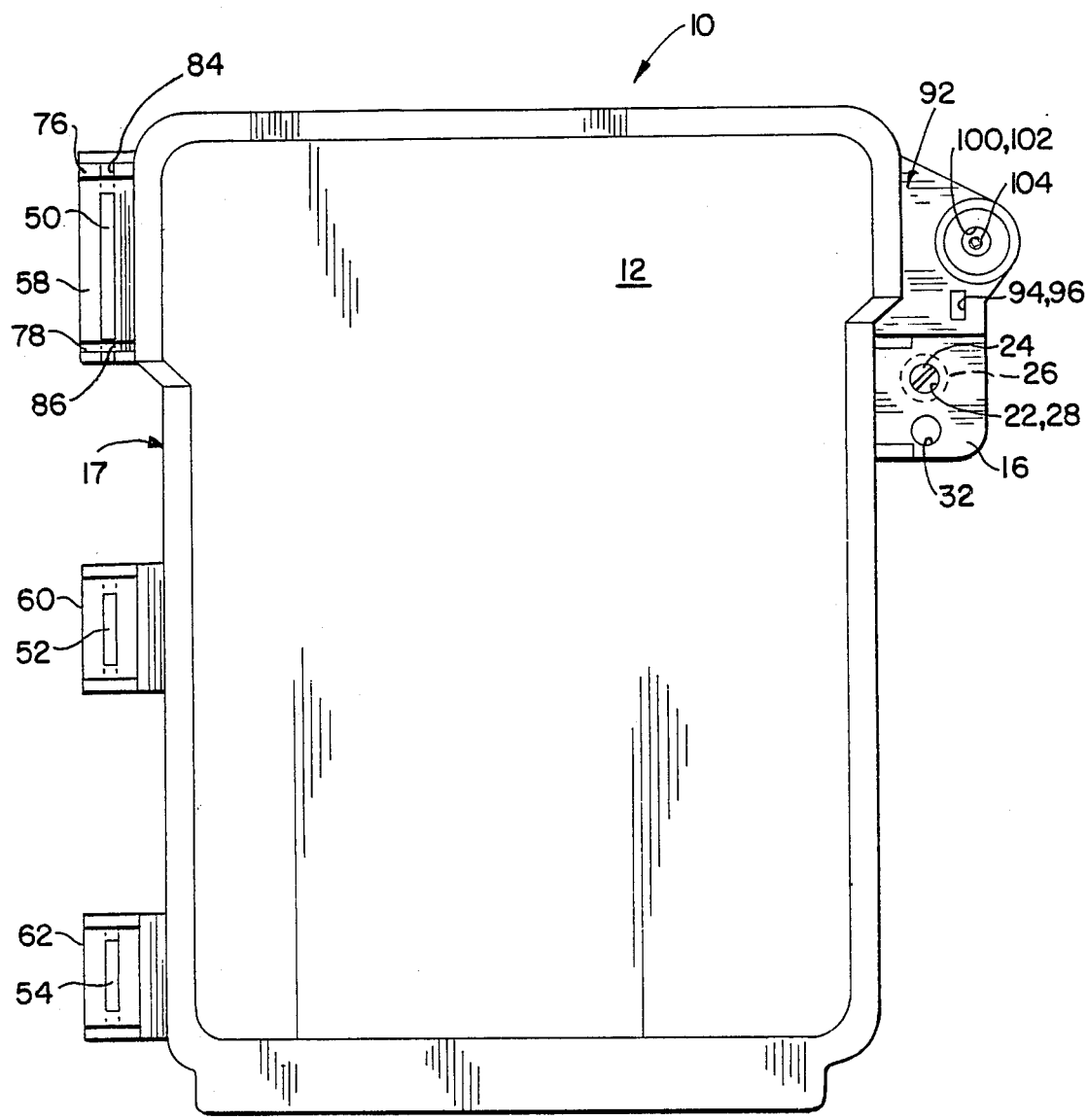
FIG. 1 is a top plan view of one embodiment of a retrofit telephone network interface apparatus with its cover closed, according to the principles of the present invention.
Figure 2:
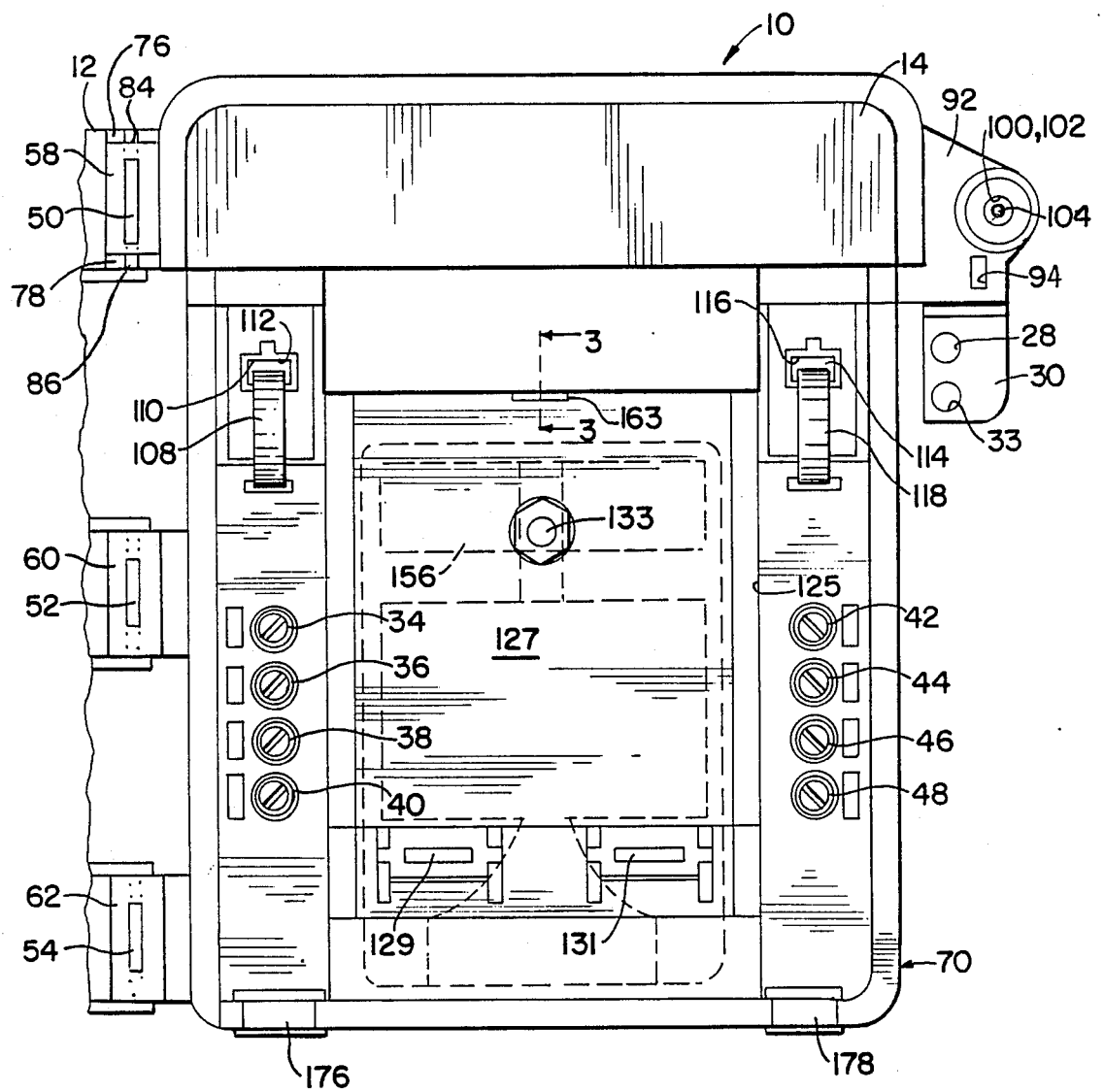
FIG. 2 is a top plan view of the apparatus shown in FIG. 1 with the hinged cover broken away in the open position and the shield member in a closed position.
Figure 3:
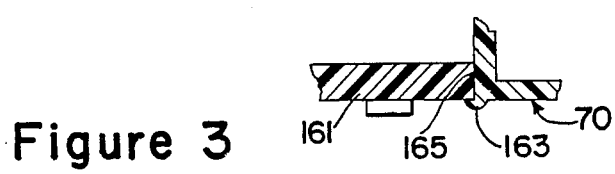
FIG. 3 is a partial enlarged view along the line 3—3 of FIG. 2 showing the engagement of the base member and an existing station protector.
Figures 4, 5:
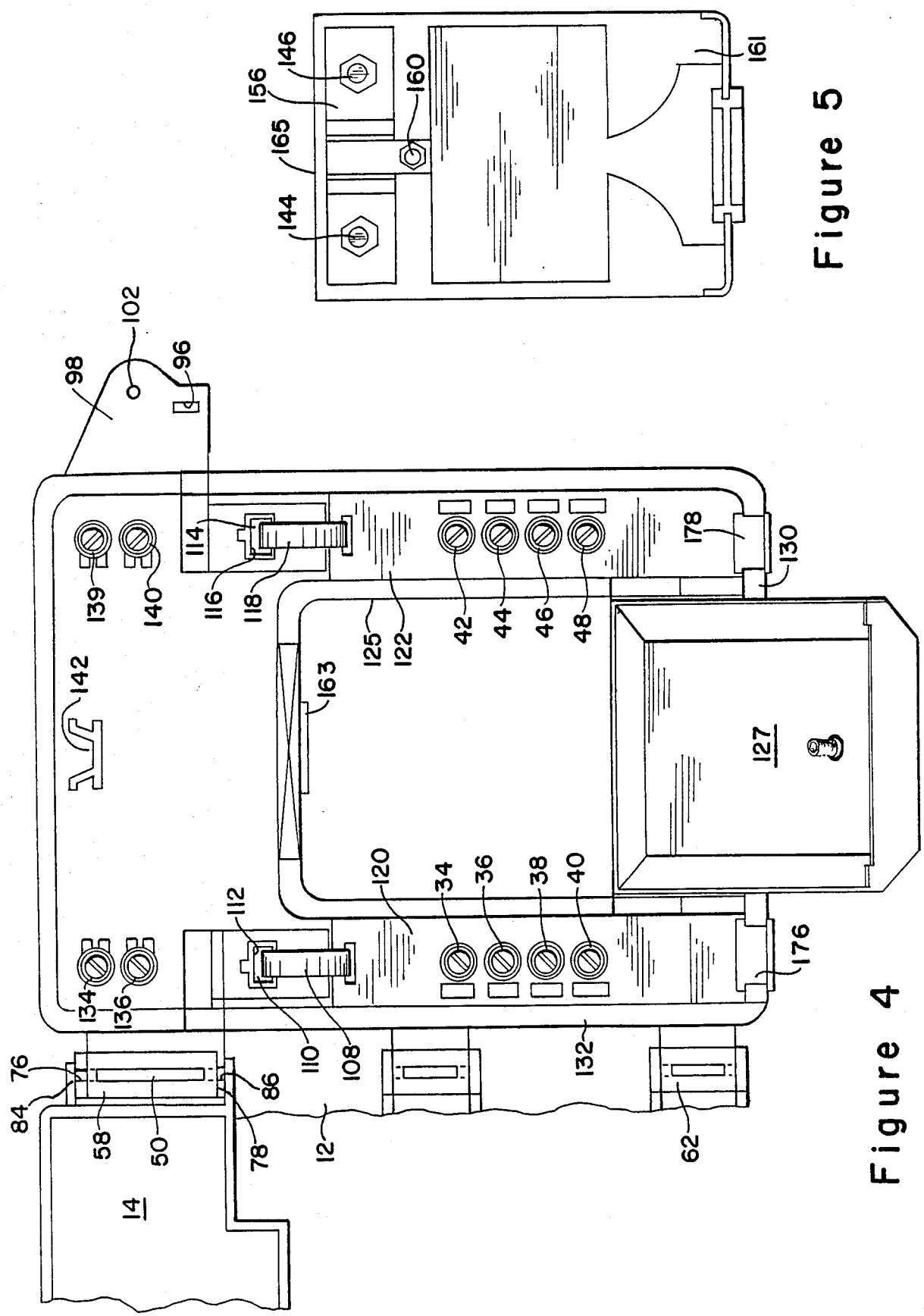
FIG. 4 is a top plan view of the base member of the apparatus shown in FIG. 1 with the cover and its associated shield member broken away in the open position with the base closed portion pivoted open.
FIG. 5 is a top plan view of one type of existing overvoltage stat-on protector apparatus.

Referring now to the figures, and in particular, to FIGS. 1, 2 and 4, there is shown a telephone network interface apparatus 10, according to the principles of the present invention, that includes a cover member 12 to which is affixed a shield member 14. The manner in which the shield member 14 is affixed to the cover member 12 will be described in detail hereinafter.

The cover member 12 is provided with an extended lip portion 16 which is provided with an aperture 22 adapted to receive a conventional slotted screw 24 therein. Screw 24 is provided with an extended head portion (skirt) 26 which is larger in diameter than the aperture 22 and is received by and adapted to cooperate with threaded aperture 28 provided in the shield lip extension 30 (see FIG. 2). Screw 24 may be removed by a subscriber (owner of the premises) with a conventional screwdriver.

To prevent children or any individual from opening the cover member 12 and doing mischief within the apparatus, a further aperture 32 is provided in the extended lip portion 16 of the cover member 12 which coincides with aperture 33 provided in the shield lip extension 30 and into which may be inserted a locking mechanism (not shown) which the subscriber has the means for opening. Thus, the home owner (subscriber) may prevent an unauthorized person from entering or opening the telephone network interface apparatus 10, and gaining access to terminals 34, 36, 38, 40, 42, 44, 46 and 48 to which the telephone subscriber has connected his in-house telephone equipment and auxiliary equipment.

On the opposite edge 17 from lip portion 16, the cover 12 is provided with a plurality of outwardly extending bar members 50, 52 and 54 which are adapted to be received by and cooperate with outwardly extending C-shaped portions 58, 60 and 62 provided on the base member 70 (see U.S. Patent No. Des. 287,583, issued to T.J. Smith, et al.

The extending bar member 50 is adapted to be received and cooperates with extending C-shaped portions 76 and 78 that are provided with recesses 84 and 86 on shield member 14 (see FIG. 2).

Shield member 14 cannot be installed on base member 70 unless the cover member 12 is affixed thereon because of the unusual hinging arrangement set forth herein. Thus, with the arrangement as described it becomes readily obvious that the shield member 14 cannot be affixed to the base member unless the cover member 12 has been affixed thereon prior thereto.

Shield member 14 also includes a lip portion 92 which is on the opposite edge from the extending ear portions 76 and 78 and is provided with an elongated slot 94 which is positioned to appear directly above and coincide with elongated slot 96 provided on the extending lip portion 98 of base member 70. (See FIG. 4) Thus, it can be seen that any locking mechanism placed through slots 94 and 96 would lock the shield 14 of the telephone network interface 10 so that the shield could not be removed or opened unless the locking mechanism were removed by an employee of the telephone company.

In addition, an aperture 100 is provided in the portion 92 of shield member 14. A threaded aperture 102 is provided in base member 70 which coincides with aperture 100, and is adapted to receive a threaded screw 104 which has a unique shouldered head thereon not usually being received by a conventional tool that may be found in the home. Thus, a mating tool would be given to telephone company employees so that only they could conveniently remove the threaded screw from base member 70. The head of screw 104 has a collar which is larger than the aperture 100 provided in lip 92 of shield 14. Therefore, it is necessary to remove the threaded screw 104 from the base member 70 to gain access to the remaining portion of the base member 70, in addition to any locking mechanism that may be used in conjunction with slots 94 and 96.

Referring now to FIG. 2 which shows the cover 12 fully opened on its hinges exposing the terminals 34, 36, 38, 40, 42, 44, 46 and 48 together with cable wire 108, having plug 110 thereon. Plug 110 is adapted to be connected and received into receptacle 112, in a conventional manner. Plug 110 and receptacle 112, is of the conventional well-known type of which reference may be made to U.S. Pat. No. 4,146,292 as well as U.S. Pat. No. 3,990,764 and U.S. Pat. No. 3,761,869 the contents all of which are incorporated herein by reference. Typically plug 110 and receptacle jack 112 include four electrical conductors which are suitable for use on a single telephone input line. A similar duplicate arrangement is provided with plug 114, receptacle 116 and cable wire 118.

Referring again to FIG. 2 which shows the base member 70 without the cover member 12 thereon. It should be readily apparent that a telephone company employee, desirous of entering the shielded component area of the telephone network interface apparatus need only to remove screw 104 and any locking device used by the telephone company (e.g. a seal, etc.) may enter the restricted area of the interface apparatus to service any of the protected (shielded) components. This is also true should the homeowner lock his accessible portion, cover 12 to shield 14, via a locking means, not shown, inserted in apertures 32 and 33.

Referring now to FIGS. 2 and 4 wherein the base member 70 is shown to include a flat base portion 124 with an opening 125 therein having circumscribing walls 126, 128, 130 and 132 disposed thereon with a generally open top. Wall 132, as mentioned earlier, is provided with the C-shaped outwardly extending portions 58, 60 and 62 which are adapted to receive the cover member 12 and its associated shield member 14. The base member 70 is also provided with a closed portion 127. Closed portion 127 may be provided with hinges 129 and 131 similar to those provided on wall 132 to enable the closed portion 127 to be opened. Closed portion 127 may also be provided with a captive nut 133 whose functions will be described hereinafter. A plurality of vertical posts 134, 136, 138, 140 and 142 are disposed in-line at various positions within the base with slots provided therein that are adapted to receive printed circuit assembly boards, not shown, on which may be mounted any number of electronic components such as diodes, resistors, capacitors, etc. These components are utilized to provide the ringing circuitry and/or the automatic number identification circuitry (ANI) frequently incorporated on subscriber lines. Additionally, the base portion opening 127 provided in the base portion 124 is adapted to receive the base 161 with its overvoltage protection device 156, the base having a ground terminal 160 generally connected to a common ground source, not shown. Overvoltage protection device 156 and base 161 is of the type manufactured by TII Industries, Inc., of Copiague, New York as Model No. 325/326.

The wiring of the printed circuit boards to their proper locations have not been shown in order to permit the housing to be shown more clearly.

Additionally included is a wall arrangement, not shown, having slots disposed therein for easily mounting of the sockets (receptacles) 112 and 116 therein.

Thus, it can be readily seen that the base portion 124 is not divided into any particular compartment arrangement but isolation between the subscriber terminals and remaining circuitry is accomplished by utilizing the shield member 14 together with the cover member 12 and the base cover portion 127.

The base member 70 is attached to the mounting base 161 of the overvoltage protection device 156 (which is shown in FIG. 5) by moving the base member 70 perpendicular to the mounting surface of the overvoltage base 161 so that the opening 125 provided in the base 70 coincides with the overvoltage base, the movement thereof being perpendicular to the surface upon which the overvoltage base 161 is mounted. Applying a slight amount of pressure permits the engaging lip provided on base member 70 to flex slightly permitting the edge 165 of the overvoltage base 161 to be engaged and held in position on the mounting surface of the overvoltage base 161 upon which the mounting surface of 161 is affixed.

Access to the base member 70 may be obtained by grommet openings 176 and 178 provided in wall 130.

Once the base member 70 is in position, the telephone company employee may proceed to wire the rear of receptacles 112 and 114, which are normally provided with wires and lugs, not shown, to the proper terminals and at the same time removing the house wiring which are connected to the overvoltage protection terminals and connecting them to terminals 42, 44, 46 and 48 and if a second phone line is utilized to terminals 34, 36, 38 and 40. Thus, the telephone subscriber lines connected to the house wiring are now separated from the telephone company's lines. The terminals boards or skirt members 120 and 122 upon which the house wiring has been connected to may be provided with the colors, green, red, yellow and black so that an individual making connections for the first time will be sure to connect the proper color cable wire to the proper terminal internally. On the other side of terminal boards 120 and 122 the cables 108 and 118 are connected with the plugs 110 and 114 extending to the front side of the terminal board disposed proximate their respective receptacles 112 and 116. Therefore, removing plugs 110 and 114 from their receptacles disconnects all in-house wiring from the telephone company's end of the subscriber's line which are connected to the near ends of receptacles 112 and 116. Thus, if a telephone when plugged into receptacle 112 or 116 operates properly, then it can be assumed that the telephone company's lines are in proper working order and any trouble occurring would be the responsibility of the homeowner (subscriber). As becomes readily apparent by looking at FIG. 2, the only accessible portion of the telephone network interface apparatus available to the subscriber is the terminals that he requires for connection of the in-house wiring and the telephone plugs 110 and 114 which may be inserted or removed as need. Access to any other portion of the base member 70 is avoided and any overvoltage protection devices and ringing circuitry, which is included under the shield member 14 or closed base portion 127, is inaccessible to the subscriber by requiring a special tool necessary to move the threaded screw 104 and by utilizing an odd shaped head on retaining nut 133 and by utilizing a locking device in slots 94 and 96, the security of the device and maintained and only limited access to the interface apparatus is permitted. It is also to be noted that nut 133 is designed to mate with and cooperate with ground terminal stud 160 provided on the base of the overvoltage protection unit 161 so that the ground protection for the entire assembly is maintained and would therefore protect to the subscriber as he makes his connections to the subscriber's terminals.

Referring now to FIGS. 6 through 11 which disclose an alternative embodiment of the retrofit telephone network interface apparatus. Like numbers have been used in this embodiment for identical parts which are found in the first embodiment described. Where there are differences between the first and second embodiment the same number has been used with a prime appearing thereafter so that the description of the operation and components may be more readily followed.

Figure 6:
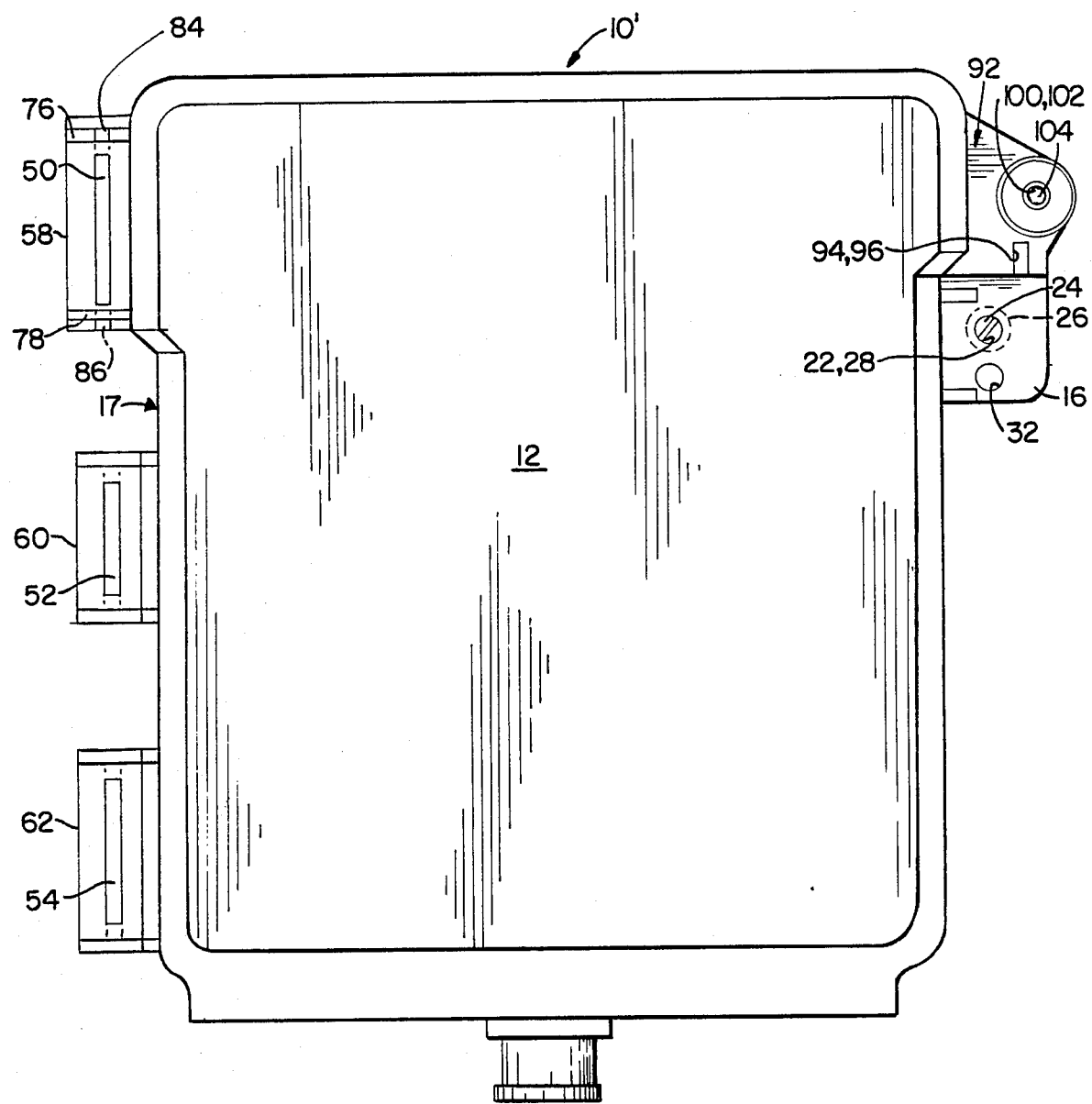
FIG. 6 is a top plan view of another embodiment of a retrofit telephone network interface apparatus with its cover closed, according to the principles of the present invention.

FIG. 6 discloses the alternative embodiment 10' with the cover closed and would appear almost identical to the original embodiment with regard to its cover and locking mechanism described hereinbefore.

Figure 7:
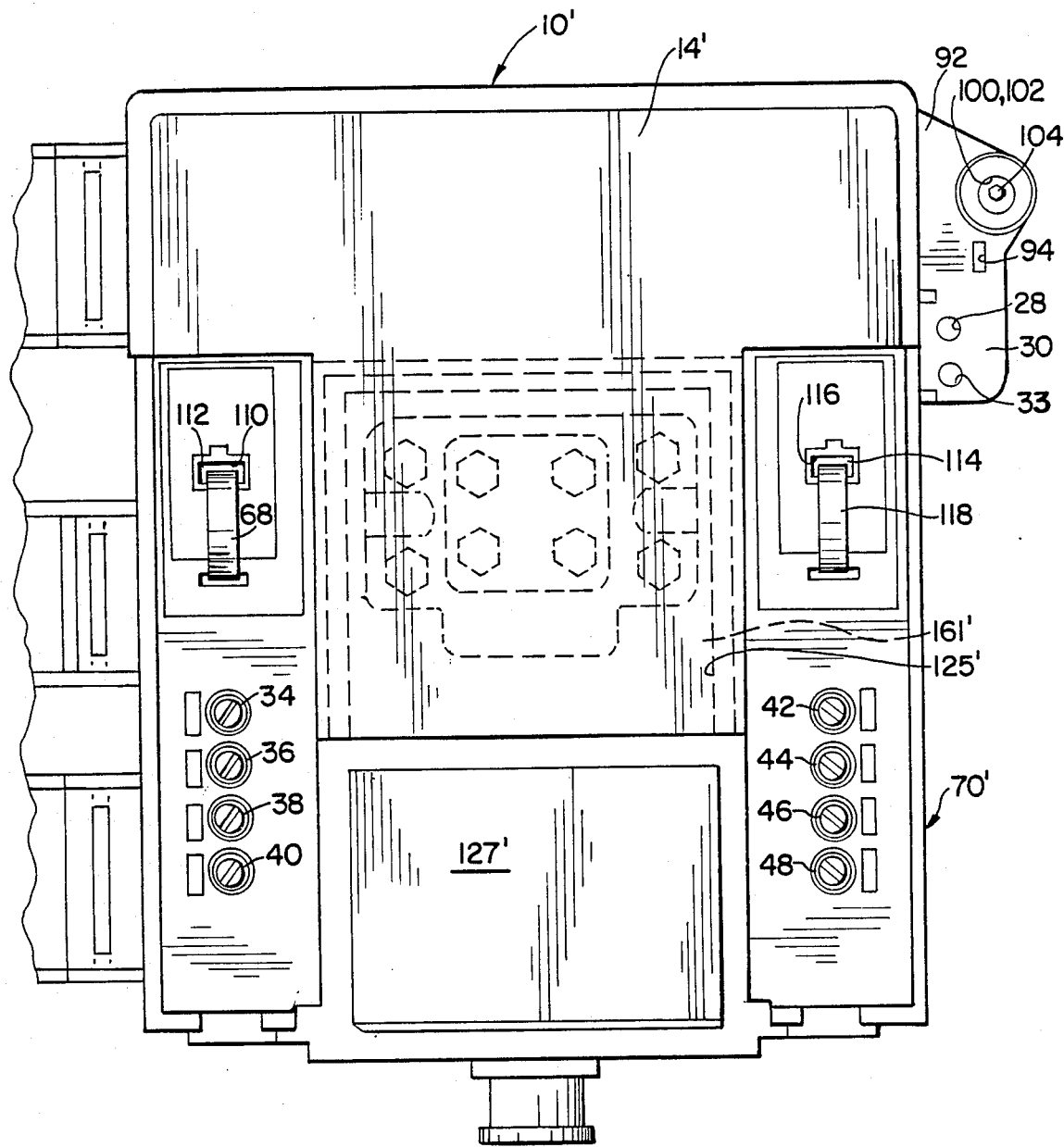
FIG. 7 is a top plan view of the apparatus shown in FIG. 6 with the broken away hinged cover in the open position and the shield member in the closed position with an existing station protector shown in position by the broken lines.
Figure 8:
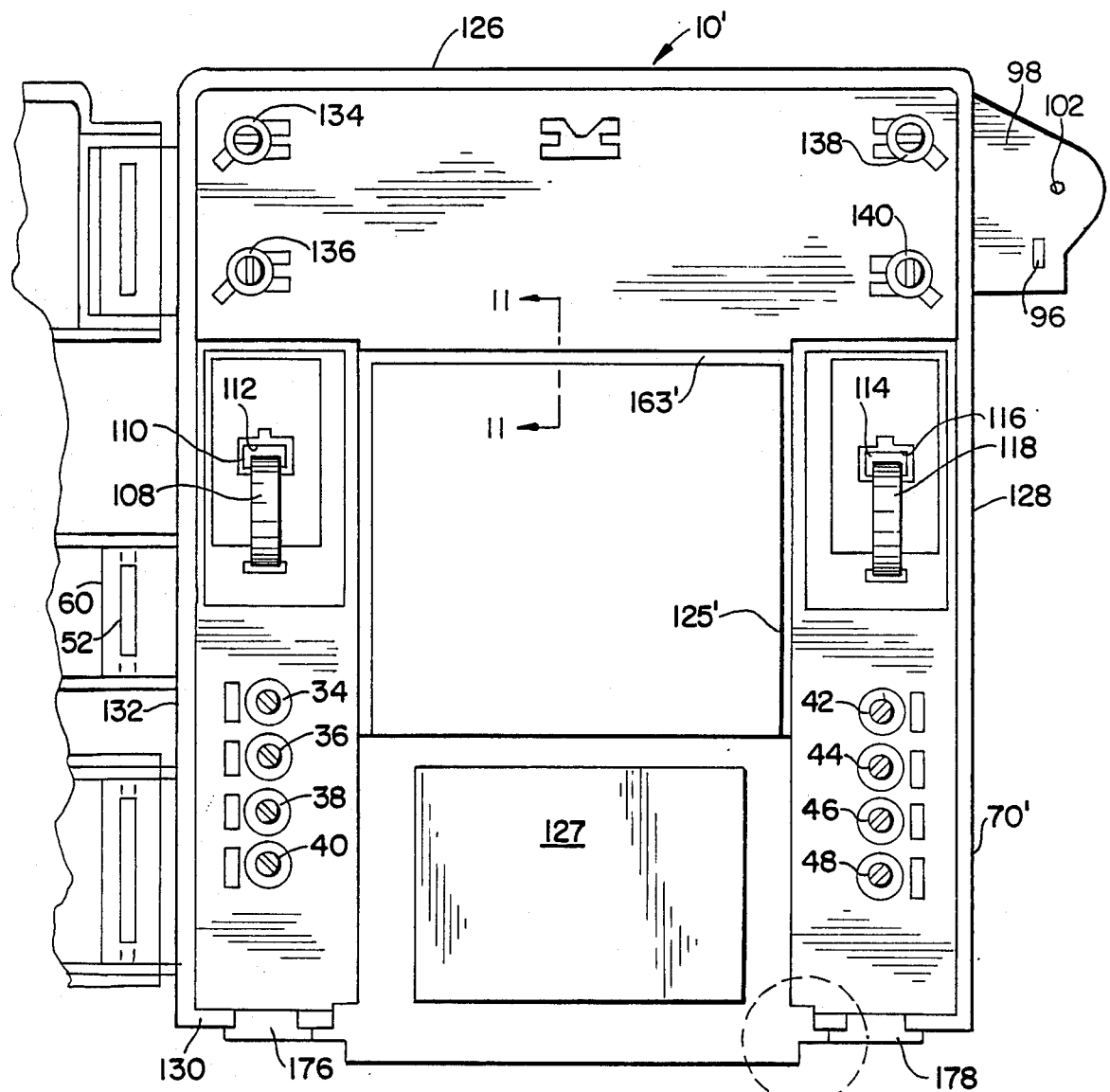
FIG. 8 is a top plan view of the base member of the apparatus shown in FIG. 6 with the cover and its associated shield member broken away in the open position.
Figure 9:
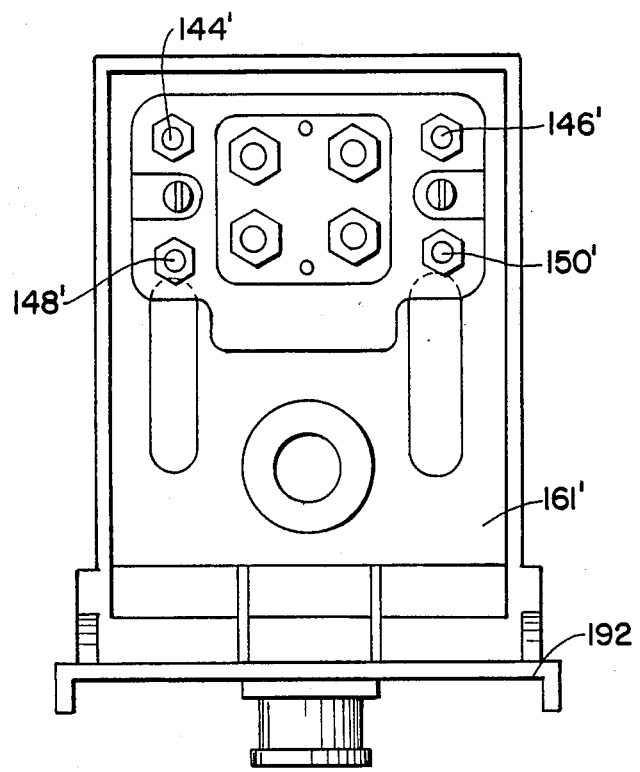
FIG. 9 is a top plan view of another type of existing station overvoltage protector apparatus.
Figure 10:
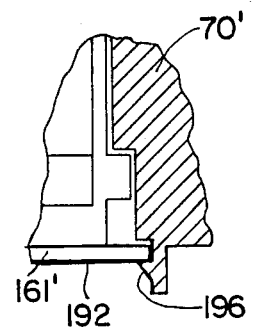
FIG. 10 is a top partial enlarged view partially in cross-section defined by the broken circular line showing the front portion engaging means of the base member and an existing station protector.
Figure 11:
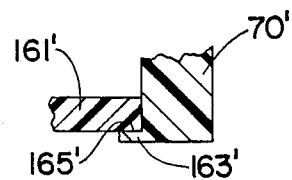
FIG. 11 is partial enlarged view in cross-section taken along the line 11—11 of FIG. 8 showing the rear engaging lip of the base member cooperating with an existing overvoltage station protector.

FIG. 7 discloses the inner portion of its components. You will note that the arrangement of the terminals to which the owner of the premises is to connect the house wiring are essentially in the same place as is the disconnect plug and cable 108 and 118. A protective covering or shield 14' is essentially the same configuration as is in the alternative embodiment, however, it is slightly different since the closed portion 127' is not provided with hinges for opening, but remains fixed. The construction of the base member 70' includes a centrally disposed opening 125, which is adapted to receive and engage the base 161' similar to the type manufactured by AT & T Technologies, New Jersey, known as Model No AT 8813B, Customer Service Closure which construction is shown without the cover in FIG. 9. The base member 70' is provided with two types of engaging mechanisms shown in FIGS. 10 and 11. The lip 163' positioned at the rear of the opening 125' is adapted to slide underneath the bottom surface of the base 161' at the same time the front portion of base 161' is provided with a front wall 192 which is adapted to cooperate with a protrusion 196, provided on base member 70', thereby locking the base member 70' to the base 161,. A view shown of FIG. 11 discloses the method in which the base of the base 161, engages the lip 163' provided on the base 70'.

In order to engage the base 70' to the overvoltage base 161' it is necessary to slide the base unit 70' along the surface upon which the overvoltage base 161' is mounted until the overvoltage base 161' is received into the opening provided in the housing 70' and the lip portion 163' and front wall 192 lock into position. This will maintain the base member 70' on the overvoltage protection base 161'. The wiring is then moved as described for the preceding embodiment.

In operation, if a problem were to occur on the telephone subscriber line, the house owner would remove plugs 110 or 114 from their respective sockets 112 and 116 and directly connect a known operating telephone instrument with its associated plug into socket 112 or 116. If the instrument operates properly then the trouble is in the homeowners wiring. If the instrument does not operate properly, then the trouble is in the telephone company's portion of the subscriber loop. In a like manner the other subscriber line may be checked. Although the present disclosure describes the use of the telephone network interface apparatus for two independent lines, it is to be understood that the same apparatus may be used for a single line with the connection of a second line at some future date.

Hereinbefore, has been disclosed a compact retrofit telephone network interface apparatus providing limited access to the contents thereof for a subscriber, while permitting complete access to the components thereof by a telephone company employee so that he may readily service and make connections thereto.

It will be understood that various changes in the details, materials, arrangement of parts and operating conditions which have been herein described and illustrated in order to explain the nature of the invention may be made by those skilled in the art within the principles and scope of the instant invention.

Having thus set forth the nature of the invention, what is claimed is:

1. A retrofit telephone network interface apparatus providing limited access for the owner of premises having a telephone subscriber loop termination disposed thereon providing complete access by telephone service employees, said retrofit apparatus being suitable for cooperating with existing station overvoltage protector installations, comprising:
   (a) a base member having;
      (i) a generally open top with a closed portion extending over a portion of said existing station protector apparatus when installed.
      (ii) a circumscribing wall portion, said wall portion including at least two outwardly extending C-shaped portions for receiving an elongated bar member in the open portion thereof, and
      (iii) a bottom portion having an opening therein for receiving and engaging with said existing station protector;
   (b) a first and second set of terminals disposed in said base member, said first set of terminals being adapted to be connected to said premises owner's subscriber loop termination and said second set of terminals being adapted to be connected to the telephone company owned portion of said subscriber loop;
   c) mating plug and socket members disposed in said base member having electrical contacts therein adapted to be electrically and mechanically engaged and disengaged with each other;
   (d) first means for electrically connecting said plug means to said first set of terminals and second means for electrically connecting said socket to said second set of terminals; and
   (e) cover means, said cover means being provided with,
      (i) at least two outwardly extending bar members adapted to be received by and cooperate with said outwardly extending C-shaped portions to provide a complete invasive free cover for said open top base member,
      (ii) said extending bar members including at least one longitudinally extending protrusion, and
      (iii) shield means, said shield means being provided with means for receiving and cooperating with said bar members' extending protrusion and having a portion adapted to cover at least said second set of terminals but not said first set of terminals.

2. A retrofit telephone network interface apparatus according to claim 1 wherein said shield means additionally covers overvoltage devices disposed within said base member.

3. A retrofit telephone network interface apparatus according to claim 1 wherein said shield means additionally covers circuitry and components disposed within said base member.

4. A retrofit telephone network interface apparatus according to claim 3 wherein said base member is provided with a plurality of slotted post members adapted to receive printed circuit board members therein.

5. A retrofit telephone network interface apparatus according to claim 1 wherein said base member wall portion is provided with an opening communicating with the inner portion of said base member providing access for electrical wires to be connected to said terminals therethrough.

6. A retrofit telephone network interface apparatus according to claim 1 wherein said first and said second electrically connecting means is a cable having a plurality of electrical conductors.

7. A retrofit telephone network interface apparatus according to claim 1 further including first and second locking means, said first locking means locking said shield means to said base member and said second locking means locking said cover means to said shield means.

8. A retrofit telephone network interface apparatus according to claim 7 wherein said first and second locking means are unlike.

9. A retrofit telephone network interface apparatus according to claim 7 wherein said first locking means includes extending lip portions provided on said base member and said shield means and said second locking means includes extending lip portions provided on said shield means and said cover means.

10. A retrofit telephone network interface apparatus according to claim 1 wherein said socket member is disposed within said base member and is not covered by said shield means.

11. A retrofit telephone network interface apparatus according to claim 1 wherein said first set of terminals is provided with a skirt means, said skirt means extending to contact a downwardly extending portion provided on said base member to prevent access to the shielded portion of said base member.

12. A retrofit telephone network interface apparatus according to claim 1 wherein said closed base portion further includes pivot means for exposing the covered portion of said existing station protector apparatus when installed.

13. A retrofit telephone network interface apparatus according to claim 12 wherein said closed base portion includes captive nut means adapted to cooperate with a ground terminal stud disposed on said existing station protector.

14. A retrofit telephone network interface apparatus according to claim 1 wherein said retrofit apparatus is attached to said existing station protector installation by sliding said retrofit apparatus along the surface to which said existing station protector is mounted until said existing installation is disposed within said retrofit apparatus.

15. A retrofit telephone network interface apparatus according to claim 1 wherein said retrofit apparatus is attached to said existing station protector installation by moving said retrofit apparatus perpendicular to the mounting surface of said existing station protector until said existing station protector is disposed within said retrofit apparatus.

* * * * *